United States Patent [19]
Mabuchi et al.

[11] 3,985,322
[45] Oct. 12, 1976

[54] ELECTRIC MOTOR MOUNTING FIXTURE

[75] Inventors: Kenichi Mabuchi, Tokyo; Yoshihisa Tsuchimochi, Ichikawa, both of Japan

[73] Assignee: Mabuchi Motor Co. Ltd., Tokyo, Japan

[22] Filed: Apr. 21, 1975

[21] Appl. No.: 569,841

[30] Foreign Application Priority Data
May 11, 1974  Japan............................ 49-53389[U]

[52] U.S. Cl................................. 248/5; 46/78; 248/14; 248/225
[51] Int. Cl.$^2$...................... A63H 27/02; A47J 7/14
[58] Field of Search............... 248/224, 14, 17, 225, 248/5; 46/78, 243 AV, 76 R

[56] References Cited
UNITED STATES PATENTS

| | | | |
|---|---|---|---|
| 2,891,489 | 6/1959 | Pietzsch | 248/224 X |
| 3,585,753 | 6/1971 | Purdy | 46/78 X |
| 3,596,861 | 8/1971 | Baldini | 248/224 |
| 3,622,116 | 11/1971 | Fellows | 248/224 X |
| 3,738,058 | 6/1973 | Mabuchi | 46/78 X |
| 3,881,677 | 5/1975 | Ihlenfeld | 248/224 X |

FOREIGN PATENTS OR APPLICATIONS
1,016,563   1/1966   United Kingdom............ 248/224

*Primary Examiner*—J. Franklin Foss

[57] ABSTRACT

An electric motor casing is formed with a T-shaped groove. A mounting member comprises a first flange portion to fit in the T-shaped groove of the motor casing and second and third flange portions parallel to the first flange portion for attachment to a model airplane or the like. A beam portion connects the first, second and third flange portions. The second and third flange portions are disposed on the opposite sides respectively of the first flange portion along the longitudinal axis of the mounting member. A wall portion is perpendicular to and connects the first and second flange portions. The end of the beam portion connected to the third flange portion is enlarged to spread the sides of the T-shaped groove during mounting of the motor casing.

1 Claim, 6 Drawing Figures

ELECTRIC MOTOR MOUNTING FIXTURE

BACKGROUND OF THE INVENTION

1. Field of the Invention

This invention generally relates to an electric motor mounting fixture, and more particularly to a mounting fixture for mounting a miniature electric motor on a support member such as an electromotive model airplane or the like.

2. Description of the Prior Art

In an electromotive model airplane, as an example, the fuselage is generally connected to an electric motor by means of a mounting member. The mounting member is fastened to the fuselage with screws or the like, and is constructed to engage with a mounting member receiving portion which is integrally provided on the outer casing of the electric motor. The mounting member receiving portion is composed by two L-shaped members arranged facing each other with a space inbetween so as to form a T-shaped engaging groove. Because of this, the conventional mounting member comprises a platelike mounting portion for the fuselage of a model airplane, a platelike engaging portion to be fittingly engaged in the receiving portion of the motor casing and a joint for connecting the two portions. Thus, it is I-shaped in cross section. Conventionally, it is normal practice to manufacture such a mounting member by means of integral mold processing. However, in molding a mounting member which is I-shaped, complicated processing dies are required to mold and process a recessed portion to be formed by the I-shaped joint and, moreover, it is hard to obtain adequate accuracy.

SUMMARY OF THE INVENTION

This invention has been created with an intention to eliminate the aforesaid difficulty and its object is to provide an electric motor mounting fixture and member shaped to permit easy integral molding. Another object of this invention is to provide an electric motor mounting member which can be molded and processed by a mold and processing die consisting of a male die and a female die by which the manufacturing process is simple. A further object of this invention is to provide an electric motor mounting member which can be easily engaged with a receiving portion of an electric motor casing and is capable of firmly holding the electric motor.

An electric motor mounting fixture of this invention comprises a first member having a T-shaped groove; and a second member for mounting connection with the first member, the second member comprising a first flange portion to fit in the T-shaped groove of the first member; second and third flange portions which are parallel to the first flange portion and external of the first member when the first flange portion is fit in the T-shaped groove of the first member, the second and third flange portions being disposed on the opposite sides respectively of the first flange portion along the longitudinal axis of the second member; and a beam portion perpendicular to and connecting the first, second and third flange portions; and is characterized in that the first and second members are disposed not to longitudinally overlap with each other.

DETAILED DESCRIPTION OF THE EMBODIMENT

Figure 1:
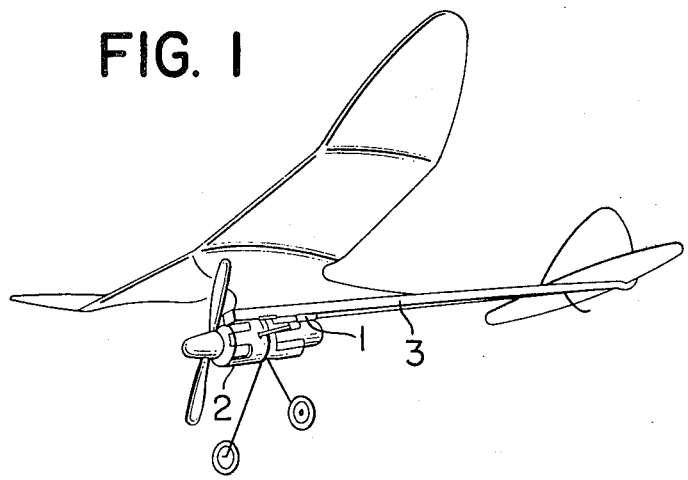
FIG. 1 is an overall perspective view of an electromotive model airplane utilizing an electric motor mounting fixture of the invention.
Figure 2:
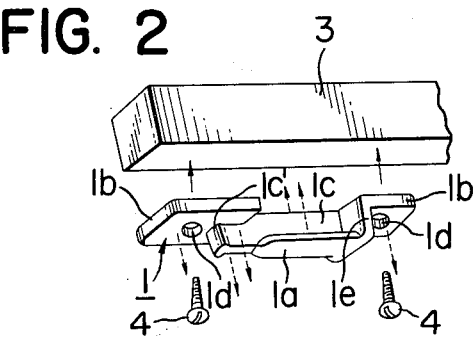
FIG. 2 is a perspective view illustrating the condition in which an electric motor mounting member of the invention is fixed to a support member which is the fuselage of the model airplane illustrated in FIG. 1, and also the construction of the mounting member.

FIG. 1 illustrates an example of an electromotive model airplane (no numeral) utilizing an embodiment of an electric motor mounting fixture of the invention in which an electric motor 2 is mounted on a support member 3 which is the fuselage of the model airplane by means of an electric motor mounting member 1. FIG. 2 illustrates the condition in which the mounting member 1 is mounted on the support member 3 of the electromotive model airplane illustrated in FIG. 1 by means of screws 4, and also the electric motor mounting member 1 having a platelike engaging or flange portion 1a, platelike mounting or flange portions 1b, a beam portion or joint 1c and mounting holes 1d for the screws 4. The electric motor mounting member 1 is formed, along its longitudinal axis, in such a manner that the flange portions 1b are disposed on the opposite sides respectively of the flange portion 1a. The portions 1b are coplaner and parallel to the portion 1a. The portion 1c is perpendicular to and connects the portions 1a and 1b. The width of the joint 1c is formed to be equal to or smaller than the space between L-shaped members of an electric motor mounting member receiving portion to be illustrated hereinafter. One end of the joint 1c where the platelike engaging portion 1a does not exist is provided with an enlarged width or expanded portion 1c'. Next, with reference to FIG. 2, the method of integrally molding the mounting member 1 will now be described. The molding is to be done by means of a male die defining the platelike mounting portions 1b and the void portions therebetween and a female die defining to the platelike engaging portion 1a and the void portions extending from the ends thereof. The mounting member 1 can be integrally molded by separating the male and female dies in the directions shown by arrows in broken lines.

Figure 3:
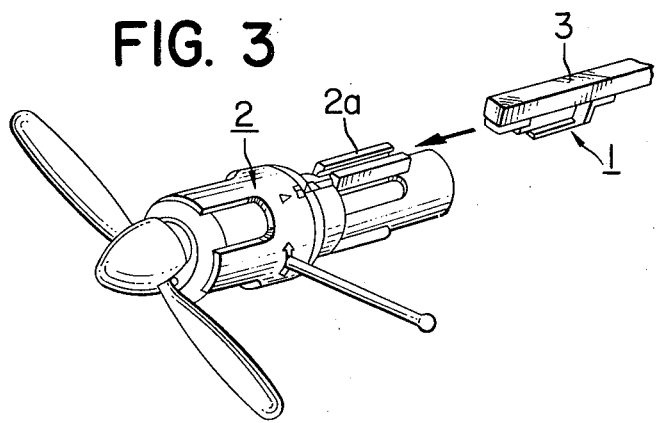
FIG. 3 is a perspective view illustrating the engagement between the electric motor mounting member of the invention and an electric motor.

FIG. 3 illustrates the condition of the mounting member 1 mounted on the support member 3 to be engaged with the aforesaid mounting member receiving member or portion 2a provided on the casing of the electric motor 2. The mounting member receiving portion 2a is composed of two L-shaped members (no numerals) which are arranged facing each other with a space inbetween as to define a T-shaped groove. The mounting member 1 and member 2a in combination constitute a mounting fixture according to the invention, and the mounting member 1, which is novel in itself, is also within the scope of the invention. In engaging the mounting member 1 with the mounting member receiving portion 2a, the expanded portion 1c' of the joint 1c keeps the sides of the mounting member receiving portion 2a slightly spread while the platelike engaging portion 1a is inserted and fit in the T-shaped groove of the portion 2a.

Figure 4:
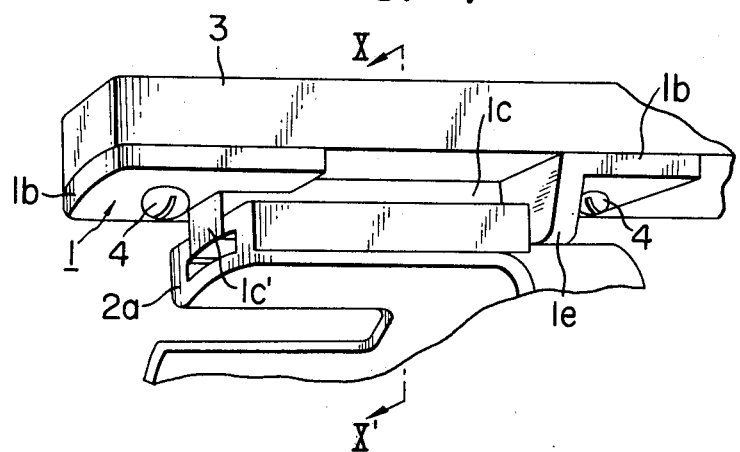
FIG. 4 is a perspective view illustrating the condition in which an electric motor is mounted on a support member which is the fuselage of the model airplane illustrated in FIG. 1 by means of the electric motor mounting member of the invention.

Upon completion of the aforesaid engagement, undesired relative movement of the mounting member 1 and the mounting member receiving portion 2a in the longitudinal direction is prevented by the expanded portion 1c' and a retaining wall portion 1e as illlustrated in FIG. 4. The retaining wall 1e, as clearly illustrated in FIG. 2, is perpendicular to and connects the platelike engaging portion 1a, one of the platelike mounting portions 1b and the wall 1e.

Figure 5:
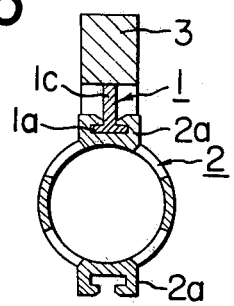
FIG. 5 is a section along the line X—X' of FIG. 4.

As clearly seen in FIG. 5 illustrating the cross section taken along the wall X—X' of FIG. 4, the electric motor 2 is securely held to the support member 3 as the platelike engaging portion 1a and the lower portion of the joint 1c are fit in the T-shaped groove of the portion 2a. Although FIG. 5 shows the width of the joint 1c to be equal to the space between the L-shaped portions of the mounting member receiving portions 2a, a smaller width will not weaken the tie between the electric motor 2 and the support member 3 since they are fixed by means of the expanded portion 1c' and the retaining wall 1e.

Figure 6:
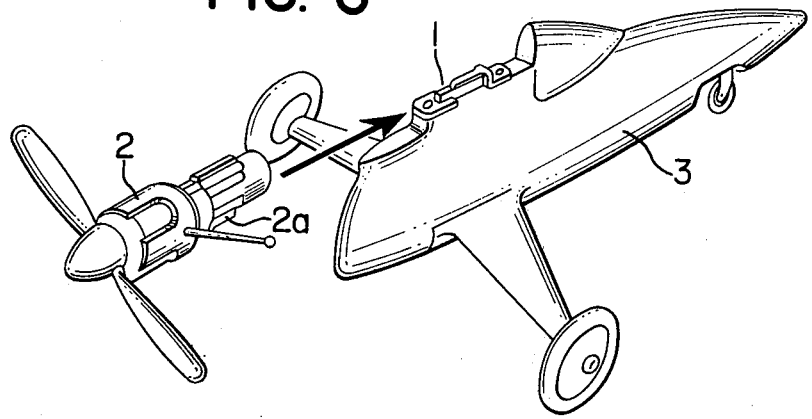
FIG. 6 is an overall perspective view of an electromotive propeller model automobile utilizing an electric motor mounting fixture of the invention.

FIG. 6 illustrates the condition in which the electric motor 2 is fixed to a support member 3' which is the body of an electromotive propeller model automobile by means of an embodiment of an electric motor mounting fixture of the invention, wherein the electric motor mounting member 1 is mounted on the support member 3' by means of an adhesive or the like. A similar connection to that illustrated in FIG. 4 can be obtained by engaging the lower one of two mounting member receiving portions 2a provided on the top and bottom of the electric motor 2 as illustrated in FIG. 5 with the electric motor mounting member 1 in the direction shown by an arrow. As aforesaid, the electric motor mounting member 1 having an I-shaped cross section is constructed so as not to have the area in which the platelike engaging portion 1a exists and these in which the platelike mounting portions 1b exist overlapped in the longitudinal direction. Due to the constuction, it is possible to integrally mold the electric motor mounting member 1 of the invention with ease by using a pair of male and female dies and by separating them in the direction indicated by arrows in broken lines in FIG. 2. It is also possible to improve work efficiency using this molding system and to reduce manufacturing costs. Furthermore, the electric motor mounting member 1 of the invention is characterized in that the electric motor 2 can be securely fixed to the support member 3 by means of the expanded portion 1c' and wall 1e.

What is claimed is:

1. A molded fixture for mounting an electromotor on a support member wherein the motor has a receiving portion including two L-shaped members which face each other with a space inbetween defining a generally T-shaped groove, said fixture comprising an elongated beam having first and second ends and upper and lower surfaces, first and second plate-like mounting portions having upper and lower surfaces, said mounting portions being formed integrally with said beam proximate said first and said second ends thereof for securing said fixture to a support surface, said upper surface of said first and said second mounting portions being coplaner with each other and perpendicular to the plane of said beam, a retaining wall formed integrally with said second end of said beam and said second mounting portion, said retaining wall being perpendicular to the length dimension of said beam, a plate-like engaging portion formed integrally with said lower surface of said beam and extending from said retaining wall and said second mounting portion in a direction toward said first mounting portion, said engaging portion being in a plane that is parallel to and spaced from said first and said second mounting portions and perpendicular to the plane of said beam, said engaging portion terminating intermediate said first and said second ends of said beam and a laterally expanded portion formed integrally with said first end of said beam and extending from said lower surface of said beam to said lower surface of said first mounting plate, the width of said beam being slightly less than the space between the L-shaped members, the width of said expanded portion being slightly greater than the width of said beam and the space between the L-shaped members, said engaging portion being adapted to occupy the remaining part of the T-shaped groove when said beam is positioned in the space between the L-shaped members.

* * * * *